(12) United States Patent
Cheng et al.

(10) Patent No.: US 7,442,295 B2
(45) Date of Patent: Oct. 28, 2008

(54) WATER PURIFICATION AND TREATMENT APPARATUS AND TREATMENT PROCESS USING THE APPARATUS

(76) Inventors: Jian-Rung Cheng, No. 115, Lane 210, Jen-Da 1st Street, Wen-Shan, Taipei (TW); Tong-Fu Hsiao, No. 115, Lane 210, Jen-Da 1st Street, Wen-Shan, Taipei (TW)

( * ) Notice: Subject to any disclaimer, the term of this patent is extended or adjusted under 35 U.S.C. 154(b) by 3 days.

(21) Appl. No.: 11/485,993

(22) Filed: Jul. 14, 2006

(65) Prior Publication Data

US 2008/0011659 A1 Jan. 17, 2008

(51) Int. Cl.
*C02F 3/02* (2006.01)
*C02F 9/00* (2006.01)

(52) U.S. Cl. .............. 210/151; 210/260; 210/312; 210/408; 210/411; 210/528

(58) Field of Classification Search .......... 210/150, 210/151, 259, 260, 262, 311, 312, 313, 528, 210/408, 411
See application file for complete search history.

(56) References Cited

U.S. PATENT DOCUMENTS

| | | | | |
|---|---|---|---|---|
| 1,065,992 A | * | 7/1913 | Wheelock | 210/312 |
| 1,935,642 A | * | 11/1933 | Laughlin | 210/311 |
| 2,008,507 A | * | 7/1935 | Laughlin | 210/151 |
| 2,388,795 A | * | 11/1945 | Montgomery et al. | 210/151 |
| 3,238,124 A | * | 3/1966 | Burton | 210/615 |
| 3,298,529 A | * | 1/1967 | Longnecker | 210/528 |
| 3,371,788 A | * | 3/1968 | Smith | 210/528 |
| 3,494,462 A | * | 2/1970 | Baud | 210/528 |
| 3,800,955 A | * | 4/1974 | Edgerton et al. | 210/528 |
| 4,017,402 A | * | 4/1977 | Fitch | 210/528 |
| 4,895,645 A | * | 1/1990 | Zorich, Jr. | 210/150 |
| 4,931,183 A | * | 6/1990 | Klein et al. | 210/151 |
| 5,609,754 A | * | 3/1997 | Stuth | 210/151 |
| 5,620,602 A | * | 4/1997 | Stuth | 210/151 |
| 5,702,594 A | * | 12/1997 | Yamasaki et al. | 210/151 |
| 5,702,604 A | * | 12/1997 | Yamasaki et al. | 210/151 |
| 6,217,759 B1 | * | 4/2001 | Kolesnikov et al. | 210/151 |
| 6,371,308 B1 | * | 4/2002 | Zhou | 210/528 |

* cited by examiner

*Primary Examiner*—Christopher Upton
(74) *Attorney, Agent, or Firm*—Birch, Stewart, Kolasch & Birch, LLP

(57) ABSTRACT

The present invention provides a water purification and treatment apparatus using a combination of sedimentation, filtration, and bio-contact aeration processes, which comprises at least one rapid water purification filter having a hopper base for settled sludge and a filtering tank; at least one cylindrical settling basin for sedimentation and filtration; and at least one aeration basin having an under water and an over water biofilm contact parts, for rapidly filtering raw water or wastewater contacted with bio-contact aeration, and performing water purification and treatment.

7 Claims, 6 Drawing Sheets

WATER PURIFICATION AND TREATMENT APPARATUS AND TREATMENT PROCESS USING THE APPARATUS

BACKGROUND OF THE INVENTION

1. Field of the Invention

The present invention relates generally to a water purification and treatment apparatus, and in particular to a water purification and treatment apparatus and a water purification and treatment process using a combination of sedimentation, filtration, and bio-contact aeration processes.

2. The Prior Arts

The purpose of purifying and treating raw water, sewage or wastewater is, in general, to improve water quality to reach the standard for fresh drinking, or the standard for discharging. As to the former, a reverse osmosis process is commonly used no matter what is the source of water to be purified, which may be, for example, seawater, river water, well water or rainwater. As to the latter, based on the source of sewage or wastewater to be purified, an anaerobic chemical treatment process, an aerobic activated sludge process, a bio-contact aeration process and the like, or a combination thereof may be used to purify the water to reach the standard for discharging. For example, the sewage or wastewater discharged from a stock farm is often treated using a chemical coagulating sedimentation process, together with an activated sludge process or a bio-contact aeration process.

However, whether a reverse osmosis process is used to purify raw water, or a chemical coagulating sedimentation process is used to purify sewage or wastewater discharged from various industries, although some extent of purification effect can be realized, chemicals must be used. Over a long time of treatment, large amounts of chemicals will be consumed, at the same time, more sludge will be produced and may be noxious due to residual chemicals contained therein, which thereby can not be utilized directly as organic fertilizer, and also is not suitable to be buried directly, but should be further disposed, resulting in the increase of disposal costs. Further, the efficiency of water purification is limited by using the above processes. For example, as to the reverse osmosis process, the output of treated water suitable for fresh drinking is only about 30% of input water, and the wastewater generated is up to be 70%.

Additionally, the activated sludge process has many advantages, such as being environmental-friendly, substrates being mixed uniformly, good operability and low apparatus costs. But, a conventional activated sludge aeration basin can not provide sufficient dissolved oxygen amount because the sludge will be restricted in limited aeration time and space duration its treatment, especially as large amounts of microorganisms propagate in the water and consume much dissolved oxygen in the water. Therefore, if aeration amount in unit time and temperature control are not operated appropriately, many microorganisms will die rapidly. Accordingly, it is required to perform reducing volume treatment to the expanded sludge, which, on the contrary, results the sludge to be a pollution source. It is not suitable for treating lots of sewage and wastewater. As to the bio-contact aeration process, which is improved based on the activated sludge process, has the advantages in that microorganisms are abundant, sludge is less, and sedimentation is easy relatively, but also has advantages in that filtering materials are easy to be blocked by residuals, difficult to be cleaned, and lack of operation flexibility, therefore it is also economic.

A combination of activated sludge process and a bio-contact aeration process is proposed to treat wastewater and sewage discharged from a slaughterhouse, which can reduce ⅓ sludge amount as compared with a simple activated sludge process. But, when much more sewage and wastewater is treated, the sludge amount generated is still very annoying and need to be further reduced in volume. Therefore, in an existing water treatment apparatus, due to the restriction of further treatment of sludge, a settling basin equipped therewith at most only can treat 500~2000 Kg water. Treatment scale will be somewhat limited.

Raw water, which can be treated by the reverse osmosis process, relatively has little foreign materials or less pollution. However, as an example of river water or well water, once at the previous treatment stage it is required to perform the steps of sand stones and foreign materials removing, bacteria killing, chlorine removing, coagulating sedimentation, and cleaning. In addition, due to influence of industrial wastewater and polluted air, the saw water also contains much heavy metal therein. Therefore, even though the raw water is ocean water, besides salts contained therein, the concentration of mercury and lead is also high, and those can not be removed by the reverse osmosis process over a long time of period.

In addition, a conventional circular settling basin uses the principle that the heavier sludge settles rapidly to discharge the settled sludge through a discharging outlet, rather than uses a sludge scrapping device. Therefore, the sludge around the discharging outlet may be unable to be discharged out successfully, but settled and accumulated there gradually. Further, since a water inlet and a water outlet both are positioned above the basin, even the sludge can be settled to some extent due to its higher specific density, the output water will also contains some sludge. The apparatus also has the disadvantages of short life time, high maintenance costs and uneconomic.

As to a conventional square basin having a sludge scrapping device, the device operates reciprocally, therefore each sludge scrapping cycle has an idle stoke of wasted time. Therefore, in summarization of the above apparatuses, they all has the disadvantages of short life time, high maintenance costs and uneconomic.

SUMMARY OF THE INVENTION

A primary objective of the present invention is to provide a water purification and treatment apparatus, by which the water purification and treatment can be performed rapidly, the capacity of treatment is big, the sludge generated duration operation is less and can be used as organic fertilizer directly, at the same time, a wide range of kinds of water sources can be treated.

In order to achieve the objective, the present invention provides a water purification and treatment apparatus, which is composed of a filtration unit, a bio-contact aeration unit and a settling unit using a combination of sedimentation, filtration and bio-contact aeration processes, characterized in that the filtration unit is composed by a rapid purifying and filtering machine having a hopper base for containing settled sludge and a filtering tank; and the bio-contact aeration unit is composed of at least one bio-contact aeration basin that is composed of at least one under water bio-film contact part and at least one over water bio-film contact part, The bio-contact aeration basin is used to increase the dissolved oxygen amount of the water to be treated by means of the over water bio-film contact part, thus allow microorganisms flown into the under water bio-film contact part to have much more oxygen, which is beneficial for the culture of microorganisms, and the efficient decomposing of foreign materials contained in the water by the microorganisms.

Further, the bio-contact aeration unit also comprises an aeration generator, which is used to blowing the air therein by means of a blower, and supplying the air by means of an aeration inlet disposed at the bottom of the bio-contact aeration basin, thus forming an aeration from down to up, whereby increasing the dissolved oxygen amount of the under water contact part of the bio-contact aeration basin.

In the water purification and treatment apparatus of the present invention, instead of a general front treatment basin and a sand filter that contain chemicals for treating raw water, or a chemical treatment basin and/or activated sludge basin for treating sewage and wastewater, a filtration unit and/or a settling unit is used therein, which can remove sedimentation sludge (SS), oxide (COD), and chemical pigment (BOD) without addition of any chemicals, thus provides a water treatment apparatus absolutely free of chemicals and large space occupation.

The rapid water purification filter (as shown in FIG. 1) used in the sludge filtration unit of the present invention provides an automatic rapid sewage filter, which is very rapid and convenient in treating large amounts of and complicated sewage. The structure of the filter is designed as normal pressure. The hopper base has the function of setting sludge, thus reduces the filtration burden of the filtering tank and increases the filtration capacity. Special filtering yarns are provided in the filtering tank, which are resistant of high temperature, low temperature, strong acid and strong alkali, and have substantially average clearances between adjacent yarns, which can maintain filtration quality and even flowing of water. An automatic switch is provided for time control a water valve 60, thus its operation is simple, safely and no dangerous.

An automatic filter reverse cleaning function is also provided. When the filter performs reverse cleaning, the special filtering yarns are stretched sufficiently, and water is supplied through a reverse cleaning water inlet to clean the special filtering yarns, and then discharged out through a sewage discharging pipe outlet, thus realizing an effect of sufficient cleaning.

In order to maintain the filtration function of the special filtering yarns of the rapid water purification filter, besides automatically timing the time for reverse cleaning, the present invention also provide an ultrasonic oscillator 119, such that the special filtering yarns can be cleaned efficiently through the cleaning process in combination of the ultrasonic oscillation function.

In addition, the bio-contact aeration unit of the present invention can be composed of one or more bio-contact aeration basin(s) depending upon the water source to be treated, wherein each bio-contact aeration basin can be composed to be a group having a front aeration tank and a rear aeration tank, and both can be identical or different each other, but at least one aeration tank comprises an over water bio-film contact part and an under water bio-film contact part.

The filtering materials of the over water bio-film contact part do not penetrate into the water, while the filtering materials of the under water bio-film contact part penetrate wholly into the water. The over water bio-film contact part utilizes wood filtering materials or plastic filtering materials such as PP, PE, and PVC which are in accordant with environmental protection provisions and suitable for the adherence and growth of algae, and the wood filtering materials are preferable. In addition, a plurality of water spraying heads are disposed over the filtering materials in a manner, such that the water to be treated firstly contacts the air to perform the first stage of oxygen dissolving during the course from the water is sprayed from the water spraying heads to the water reaches the filtering materials. When reaching the filtering materials, the oxide and suspended substances contained in the water can provide nutrition for the growth of algae, and then by means of the photosynthesis of the algae, oxygen is further generated for the water flowing through the filtering materials to perform the second stage of oxygen dissolving. As such, the water flowing into the under water bio-film contact part contains large dissolved oxygen amounts for improve the environment for the growth of microorganisms. Moreover, the over water bio-film contact part is disposed in such a matter that the wood filtering materials thereof is appropriate to be higher 50~100 cm than the water level. Additionally, The under water bio-film contact part utilizes wood filtering materials or plastic filtering materials such as PP, PE, and PVC which are in accordant with environmental protection provisions, and may be provided with an aeration generator to increase dissolved oxygen amounts.

The sludge settling unit used in the water purification and treatment apparatus of the present invention is composed by a settling basin, which has a cylindrical main body and a sludge scrapping device supported on the main body and rotated continually and circularly, so as to remove the sludge on the basin bottom efficiently.

In addition, the cylindrical main body of the settling basin is further provided with a post that is extended upwardly from the center basin bottom, on which the sludge scrapping device is supported and pivoted. Further, the post is provided with a hopper sludge gathering tank around the post and near the basin top. The sludge scrapping device is used to scrap the sludge into an U-shaped sludge directing channel disposed on the basin bottom, and then the sludge is suctioned into and accumulated within the sludge gathering tank though a sludge suction pipe, such that the sludge can be prevented from distributing into the water again due to the disturbance of the rotation of the sludge scrapping device, and the sludge scrapping device also can be prevented from rotating idly. The efficiency of sludge removing of the settling basin is thereby increased.

In order to prevent the water stream flowing into the settling basin from disturbing the settling process in the cylindrical main body of the settling basin, a guard board is further provided within the main body and around the sludge gathering tank. Further, the settling basin is an automatic system, which can reduce the labor and time cost for maintaining clean thereof.

Because the water purification and treatment apparatus of the present invention uses physical filtration and sedimentation, and biological contact aeration for removing sludge, but not uses activated sludge basins during operation, and also the rapid water purification filter used in the present invention causes large amounts of microorganisms naturally contained in the water to be treated to loss during the time of filtering suspended foreign materials, in a new activated water treatment apparatus the microorganisms in the aeration basin are come from the rapid culture in the first batch water to be treated after insolated over days. And then, besides the culture in the aeration basin, the microorganism concentration can further be increased by returning a part of sludge discharged from the settling basin back to the aeration basin. Therefore, the microorganisms used at the stage of bio-contact aeration may be dependent upon the source of water to be treated, which are general microorganisms existed in common activated sludge, such as *Paramecium Aurelia, Trachelophyllum pusillum, Aspidisca costata, Vorticella microstoma, Epistylis plicatilis, Vorticella convallaria, Euplotes patella, Opercularia coarctata, Chilodonella uncinata, Hemiophrys*

*fusidens, Vorticella alba, Carchcesium polypinum, Euplotes mocbiusi, Paramecium trichium, Euplotes affinis, Chilodonella cucullulus, Drepanomonas revolute, Varticella striata revolute, Colpidium colpoda,* and *Flagellata.* Wherein, in the treatment of seawater desalination, it is preferable to use *Flagellata, Drepanomonas revolute, V Chilodonella cucullulus, Hemiophrys fusidens, Vorticella alba, Carchcesium polypinum, Paramecium Aurelia, Trachelophyllum pusillum, Trachelophyllum pusillum,* as bio-contact aeration bacteria; while in the purification and treatment of sewage and wastewater, it is preferable to use common activated sludge microorganisms, such as *Aspidisca costata, Aspidisca costata, Vorticella microstoma, Vorticella convallaria, Opercularia coarctata, Chilodonella uncinata, Carchcesium polypinum, Varticella striata revolute, Colpidium colpoda,* and *Chiropotes albinasus.*

According to the source of water to be treated, in the water purification and treatment apparatus of the present invention, the rapid sludge filtration unit, the bio-contact aeration unit and the sludge settling unit can be combined with various numbers and orders. As required, it is also possible to additionally provide, for example, a barrier to remove big foreign materials and grease in the water to be treated, or a sludge dehydrator to reduce the volume of sludge. For example, when the water source to be treated is seawater, it is possible to connect in order a first rapid filterer, at least a group of aeration basins having the under water bio-film contact part and the over water bio-film contact part, a cylindrical settling basin, a sludge dehydrator, and a second water purification filter to form a seawater treatment apparatus. Further, if the water to be treated is domestic sewage, it is possible to provide a barrier before the first rapid filter in the seawater treatment apparatus to form a domestic sewage treatment apparatus. It is also possible to connect in order a barrier, a cylindrical settling basin, at least a group of aeration basin having the under water bio-film contact part and the over water bio-film contact part, a second cylindrical settling basin, a sludge dehydrator, and a second rapid water purification filter to form an industrial and wastewater purification and treatment apparatus.

Because the water purification and treatment apparatus of the present invention uses physical filtration and sedimentation, and biological contact aeration for removing sludge, as compared with the conventional chemical treatment or activated sludge process, the sludge generated during the water purification and treatment has little amount and does not contain poisonous chemicals, and a part of sludge generated can be returned back to the contact aeration basin for maintaining the microorganism concentration, the rest can be used for planting or used as fertilizer after simply dehydration, which can not only reduce chemicals consumption but also can reduce substantially disposal costs due to the omission of sludge disposal process, also will not burden the environment and is in accordance with environment protection.

The water purification and treatment apparatus of the present invention may be applied to treatment of raw water to make the water to reach the standard for fresh drinking and have the water output up to 98%, or applied to treatment of domestic sewage or industrial wastewater to make the water not only to reach the standard for discharging but also can be re-used.

Figure 1:
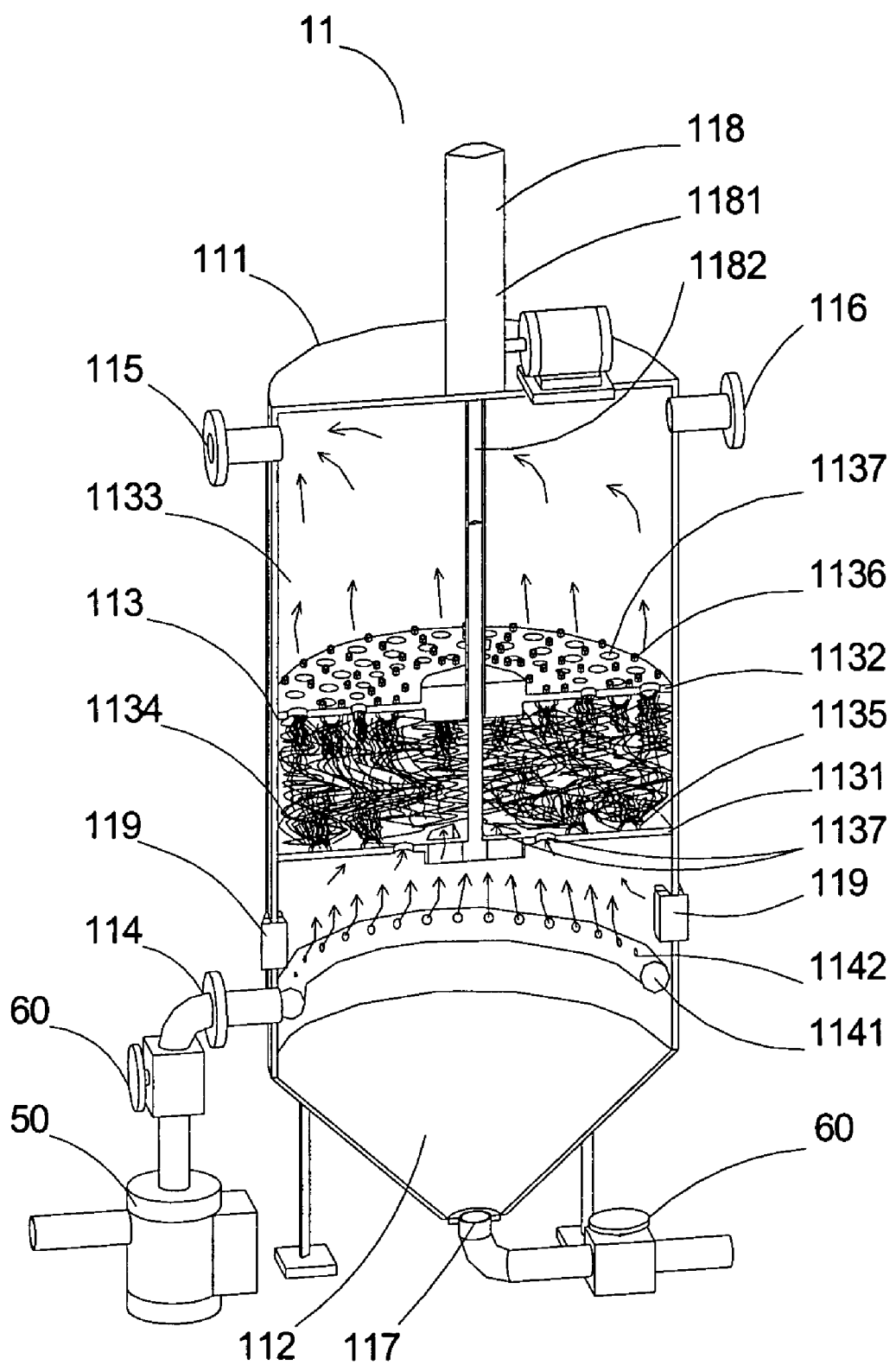
FIG. 1 is a schematic view showing the structure of a rapid purifying and filtering machine used in the present invention.

| List of reference numerals (FIG. 3) | |
|---|---|
| 1 | seawater desalination apparatus |
| 11 | first filter |
| 111 | filter housing |
| 112 | hopper base |
| 113 | filtering tank |
| 1131 | perforated fixing plate |
| 1132 | perforated moving plate |
| 1133 | hollow container |
| 1134 | special filtering yarn |
| 1135 | U-shaped connector |
| 1136 | nut |
| 1137 | perforated water opening |
| 114 | main inlet pipe |
| 1141 | ring pipe |
| 1142 | ring outlet |
| 115 | outlet pipe |
| 116 | reverse cleaning inlet pipe |
| 117 | sewage and sludge discharging pipe |
| 118 | oil hydraulic press |
| 1181 | oil cylinder |
| 1182 | main shaft |
| 119 | ultrasonic oscillator |
| 12 | first contact aeration basin |
| 12' | second contact serration basin |
| 121, 121' | front aeration tank |
| 122, 122' | rear aeration tank |
| 123 | underwater bio-membrane contact filter |
| 124 | floating bio-membrane contact filter |
| 125 | aeration generator |
| 1251 | blower |
| 1252 | air feeding pipe |
| 1253 | aeration outlet |
| 126 | watering device |
| 1261 | suction pipe |
| 1262 | watering head |
| 127 | water discharging pipe |
| C | water outlet |
| 13 | settling basin |
| 131 | cylindrical main body |
| 1311 | column |
| 1312 | U-shaped sludge directing channel |
| 132 | sludge scraper |
| 1321 | horizontal beam |
| 1322 | holder |
| 1323 | scraping cutter |
| 133 | sludge suction pipe |
| 1331 | sludge suction head |
| 1332 | sludge outlet |
| 134 | sludge gathering tank |
| 1341 | sludge discharging pipe |
| 1342 | backflow pipe |
| 135 | guard board |
| 1351 | support arm |
| 136 | water discharging pipe |
| 14 | sludge dehydrator |
| 15 | second filter |
| 16 | reverse cleaning water container |
| 2 | sewage treatment device |
| 21 | sewage barrier |
| 211 | water discharging pipe |

-continued

| List of reference numerals (FIG. 3) | |
|---|---|
| 22 | first contact aeration basin |
| 221 | front aeration tank |
| 50 | suction pump |
| 60 | timing control water valve switch |

DETAILED DESCRIPTION OF THE PREFERRED EMBODIMENT

Characteristics and effects of the present water purification and treatment apparatus will be described in detain in connection with preferred embodiments taking in conjunction of the drawings. Additionally, the following embodiments are referring to a water treatment apparatus, rather than a new activated status.

First Embodiment

Seawater Desalinating Device

Figure 3:
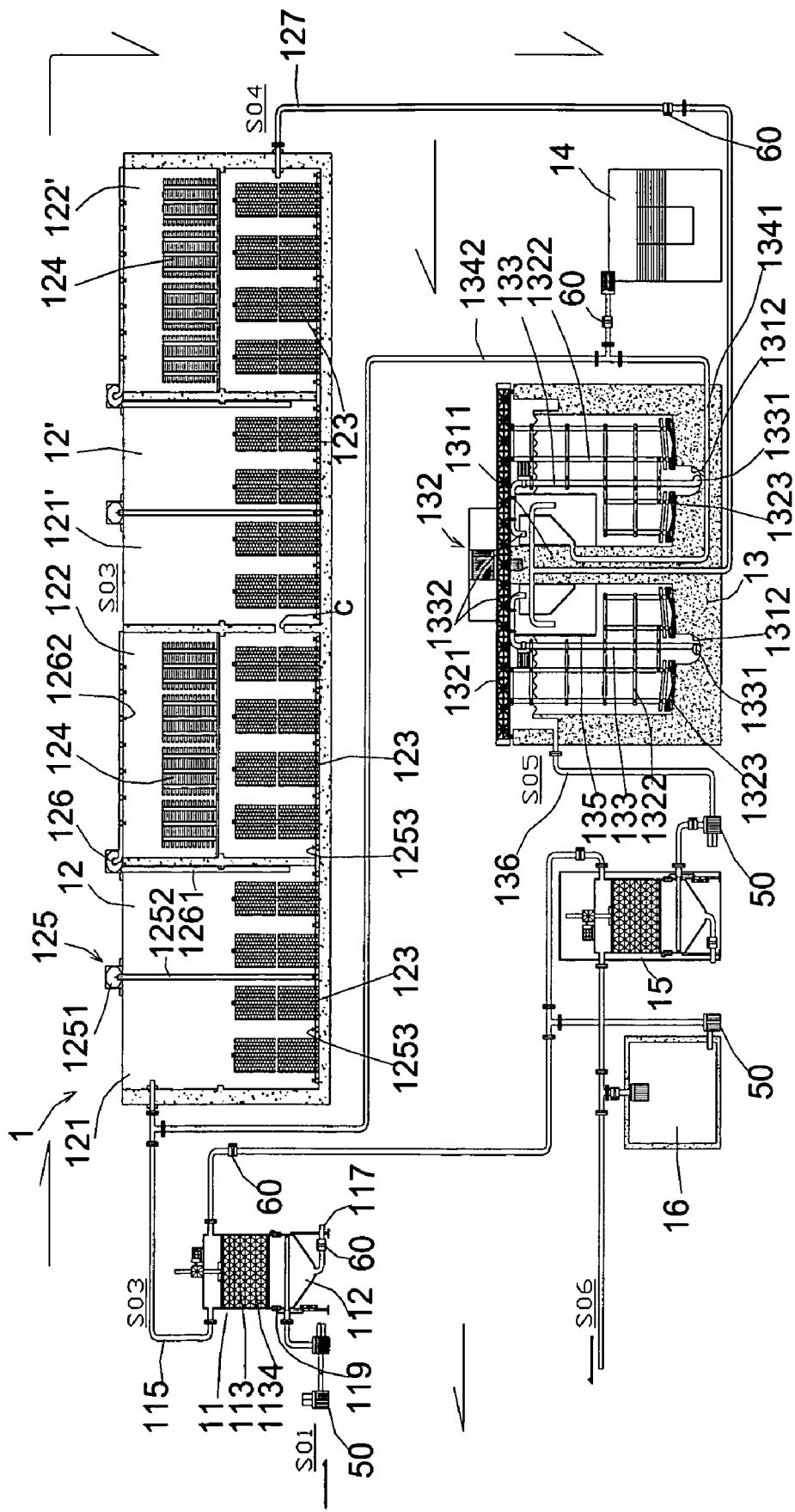
FIG. 3 is a view of a system structure of a seawater desalination apparatus in accordance with the present invention.

FIG. 3 shows a seawater desalination device in accordance with the present invention. The seawater desalination device 1 comprises a first filter, a first contact aeration basin 12 and a second contact aeration basin 12', a settling basin 13, a sludge dehydrator 14, and a second filter 15 and a reverse cleaning water container 16.

As shown in FIG. 1, the filter of the present invention is mainly composed of a body base 111, a hopper base 112, a filtering tank 113, a primary inlet and outlet pipes, a pump 50, and an oil hydraulic press 118. The hopper base 112 and the elongate barrel filtering tank 113 both connect with the primary inlet pipe 114, and suction water by the pump 50. The primary inlet pipe 114 connects with and extends into the hopper base 112, and forms a ring pipe 1141 on the hopper base 112 which has a plurality of water outlets 1142 on the upper part thereof, allows water to enter into the filtering tank 113 uniformly. Sludge carried by sewage, which is heavier than water, will deposit into the hopper base 112 rather than enter upwardly into the filtering tank 113, together with the water. Raw water or seawater, after being filtered through the filtering tank 113, will enter into the upper hollow container 1133, and then purified water after purification will discharges from the outlet pipe 115.

The body base 111, which has the function of settling sludge, comprises a perforated fixing plate 1131, a perforated moving plate 1132, a plurality of fixed U-shaped connectors 1135, a plurality of special filtering yarns 1134 that is resistant of high temperature, low temperature, strong acid and strong alkali, and a hollow container 1133. The perforated fixing plate 1131 is disposed at the joint of the filtering tank 113 and the hopper base 112, and has a perforated hole 1137 disposed at the middle part thereof and the U-shaped connectors 1135 disposed outwardly and densely at the circumference of the perforated hole 1137. The U-shaped connectors 1135 are fixed on the perforated fixing plate 1131 and the perforated moving plate 1132 by means of nuts 1136. The upper perforated moving plate 1132 is provided with a plurality of holes 1137 at the circumference thereof, the number of which is equal to that of the U-shaped connectors 1135, so that the plurality of special yarns 1134 between the two plates can be hitched fixedly. The perforated fixing plate 1131 is connected with a spindle 1182 within a cylinder 1181 of the oil hydraulic press 118. The spindle 1182 and the perforated moving plate 1132 can moves up and down within the hollow container 1133.

Figure 2:
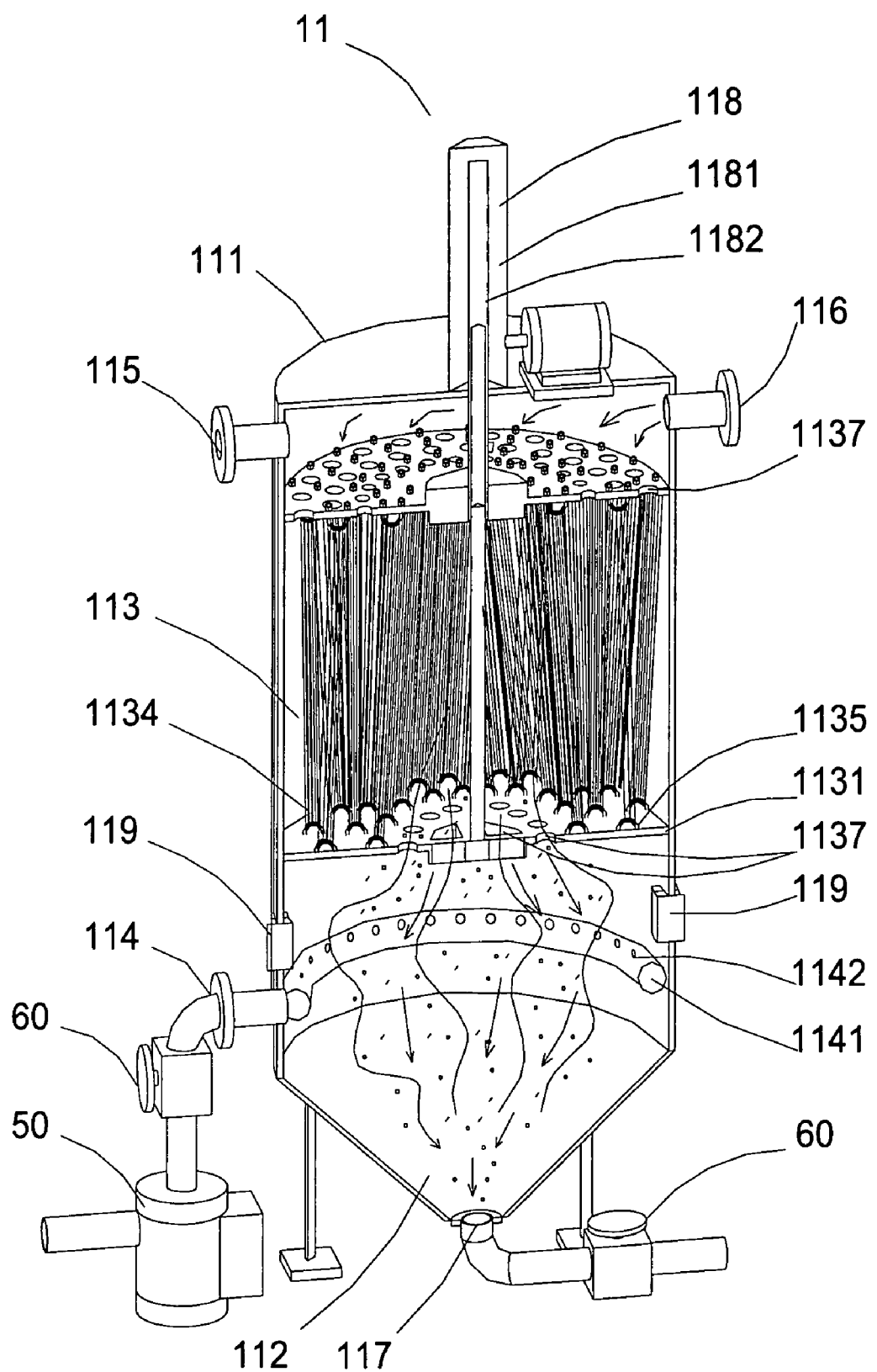
FIG. 2 is a schematic view showing the reverse cleaning structure of a rapid purifying and filtering machine used in the present invention.

The sludge filtering unit of the present invention can allow the water to be settled and filtered at the same time, thanks to the rapid purifying filter 11 used therein (referring to FIG. 2). That is to say, sludge in the water to be treated is firstly settled into the hopper base 111. And then, when the filter is operated to perform the reverse cleaning process, the special filtering yarns 1134 are sufficiently extended, and water is entered through a reverse cleaning inlet pipe 116 disposed at the circumference for cleaning the special filtering yarns. An ultrasonic oscillator 119 is disposed on the hopper base 112, such that the special filtering yarn can be cleaned efficiently and rapidly at the cleaning process in the reverse cleaning tank by ultrasonic oscillating. Suspended materials attached on the special filtering yarn can be cleaned and discharged from a sewage discharging pipe 117. Therefore, the effect of sufficient cleaning can be realized.

Firstly, the raw water or seawater is directed into the hopper base 112 of the first filter 11. Foreign articles having high specific density will be settled in the hopper base 112. When the water level exceeds the top of the hopper base 112, the upper water flows into the filtering tank 113, and suspended solids contained therein can be further removed by the special filtering yarns 1134 in the filtering tank, which is pressed to have a pore size of about 5 micrometers by the oil hydraulic press 118, thus the amount of suspended solid (SS) and total dissolved solid contained in the water can be reduced efficiently. Next, the seawater is fed into the first contact aeration basin 12 through the outlet pipe 115 of the filtering tank 113. During the reverse cleaning time set automatically, purified water is directed into the hollow container 1133 of the first filterer 11 through the reverse cleaning inlet pipe 116, and further directed into the special filtering yarns 1134 within the filtering tank 113 which is stretched sufficiently by the oil hydraulic press 118, to clean the special filtering yarns 1134, so as to clean suspended materials into the hopper base 112, at the same time, the ultrasonic oscillator 119 is activated, and suspended materials is settled in the hopper base 112. And then, the settled foreign materials are discharged from the lower sludge discharging pipe 117. The purifying filter 11 can operate long time and efficiently.

The contact aeration unit of the present invention comprises two contact aeration tanks 12, 12', each of which is composed of a front aeration tank 121, 121' having a under water bio-film contact part, and a rear aeration tank 122, 122' having an under water bio-film contact part and an over water bio-film contact part. The front aeration tanks 121, 121' and the rear aeration tanks 122, 122' each have a plurality of overlapped under water bio-film contact filter made of plastic. The rear aeration tanks 122, 122' each are divided as an upper half and a lower half. The lower half, as said above, has a plurality of overlapped under water bio-film contact filter 123 made of plastic. While the upper half has a plurality of over water bio-film contact filter 124 made of wood which are over the water surface.

As the water gradually flows from the outlet pipe 112 of the first filter 11 into the front aeration tank 121 of the first aeration basin 12, a aeration generator 125 is activated, the air is blown into by a blower 1251 and directed to a plurality of aeration outlets 1253 disposed at the bottom of the contact aeration tank through an air feeding pipe 1252. Thanks to the aeration formed at the bottom of the tank by the discharged air, the dissolved oxygen in the seawater can be increased, thus accelerating the growth of microorganisms on the cellular under water bio-film contact filter 123 and in the water, and increasing the efficient of decomposing foreign materials dissolved in the water by the microorganisms. Thereafter, the seawater, which contains the suspended microorganisms cultured in the front aeration tank 121, is fed to the rear aeration tank 122 through a water suction pipe 1261 of a water sprayer 126.

When the seawater containing the suspended microorganisms is sprayed downwardly from a plurality of spraying heads 1262 disposed at the top of the tank, it firstly contacts with the air to function as oxygen dissolving, before reaching the over water bio-film contact filter 124 made of wood in the form of laths. The wood 124 forms an environment suitable for adhere and growth of microorganisms after the seawater passing through it, and further provides the seawater with another dissolved oxygen source using photosynthesis products of the algae. Then, the seawater flows into the lower half of the rear aeration tank 122, to perform the second stage for culturing microorganisms, and at the same time to decompose the foreign materials dissolved in the seawater.

In the embodiment, a water hole C is disposed on the side wall between the lower half of the rear aeration tank 122 of the first contact aeration basin 12 and the front aeration tank 121' of the second contact aeration basin 12', thus forming communication therebetween. Therefore, the seawater flown into the rear aeration tank 122, when its level reaches the water hole C, will flow into the front aeration tank 121' of the second aeration basin 12' gradually through the water hole C, and starts another bio-film contact aeration cycle.

The structure and function of the second contact aeration basin 12' is similar to the first contact aeration basin 12, except that the front aeration tank 121' communicates with the lower half of the rear aeration tank 122 of the first contact aeration basin 12 through the water hole C, and the lower half of the rear aeration tank 122' connects to the settling basin 13 through a water pipe 127. The water pipe 127 directly extends into the main body of the settling basin.

Figure 4:
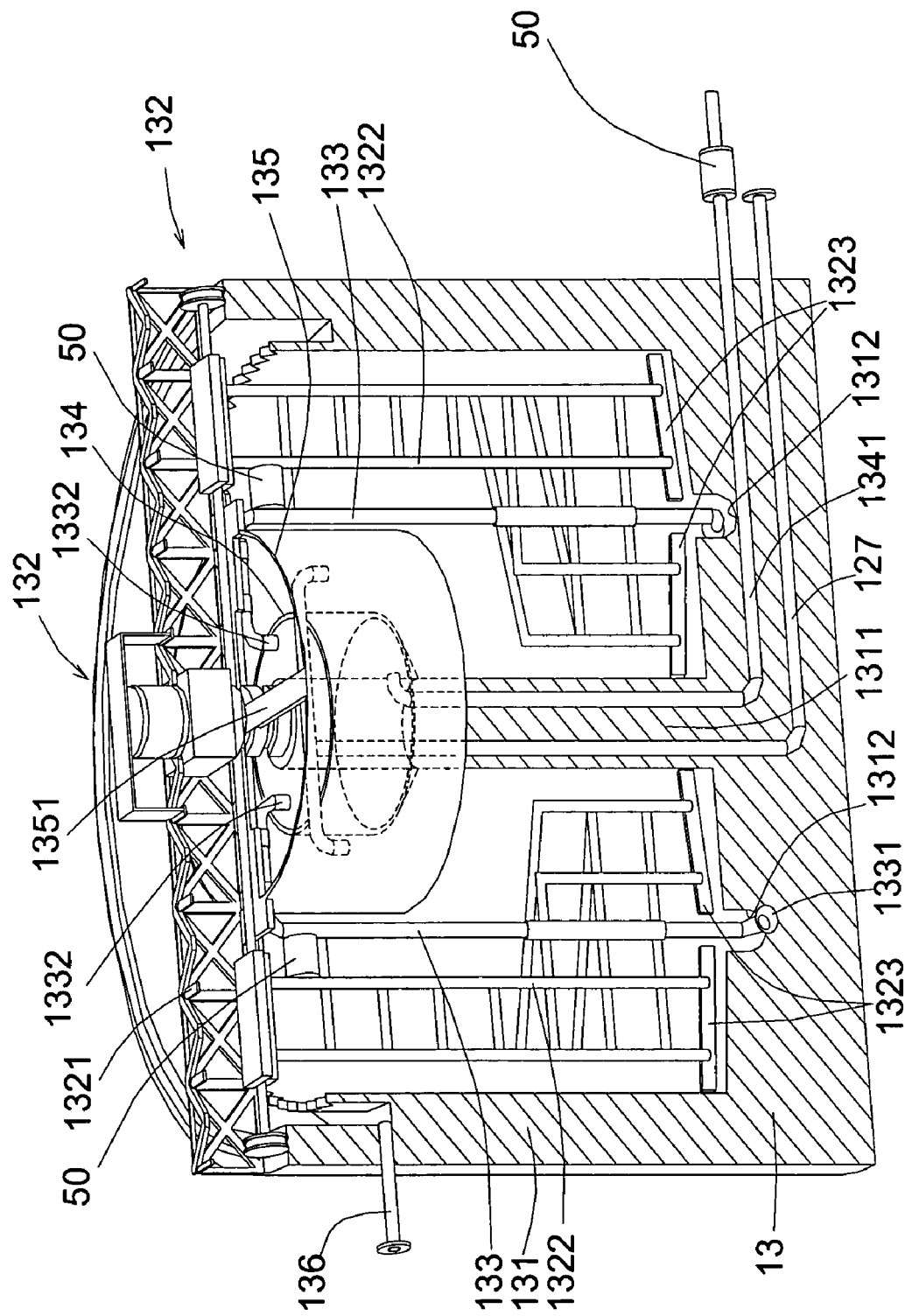
FIG. 4 is a detailed view showing the structure of a cylinder body settling basin used in the present invention.

As shown in FIG. 4, the structure of the present settling basin 13 is specially designed in that a cylindrical main body 131 has a post 1311 which is disposed at the center and extended upwardly from the bottom thereof, and a U-shaped sludge directing channel 1312 which is disposed on the bottom and surrounds the post 1311. In addition, a horizontal beam 1321 of a sludge scraper 132 is pivoted on the post 1311, both ends thereof extend towards the basin wall, and each end is supported on the side wall of the cylindrical main body 131 by means of a roller. The sludge scraper 132 also has a pair of frames 1322 extending downwardly from the horizontal beam 1321, and each of the frames 1322 has a scrapper 1323 at the end thereof adjacent to the U-shaped sludge directing channel 1312 on the basin bottom.

Additionally, a sludge suction pipe 133 is secured on the scrapper 132, one end has a sludge suction head 1331 extending into the bottom of the U-shaped sludge directing channel 1312, the other end has a sludge outlet 1332 extending into a sludge gathering tank 134 that is disposed near the basin top and surrounds the post 1311. The sludge suction pipe 133 suctions the sludge from the U-shaped sludge directing channel 1312 and into the sludge gathering tank 134, using the siphon principle or a motor pump. A sludge discharging pipe 1341 is disposed on the bottom of the sludge gathering tank 134 and communicated to a sludge dehydrator 14. In addition, a guard board 135 is disposed at the outside of the sludge gathering tank 134 and surrounds the outlet of the water pipe 127 of the bio-film contact aeration unit, to prevent the current of seawater flowing into the setting basin from interfering the settling operation. As shown in the drawings, the guard board 135 is supported on the post 1311 by means of a supporting arm 1351 at the top thereof.

The seawater, which is fed into the settling basin 13 from the water pipe 127 of the second contact aeration basin 12', contains large amounts of suspended microorganisms and aged bio-films peeled off from the under water bio-film contact part of the bio-film contact aeration unit. After being settled here, activated sludge containing microorganisms is settled on the basin bottom, gathered into the U-shaped sludge directing channel 1312 by means of the scrapper 1323, suctioned to the sludge gathering tank 134 by means of the sludge suction pipe 133, and fed to the sludge dehydrator 14 by means of the sludge discharging pipe 1341 to be dehydrated. At the same time, a part of the activated sludge is fed back to the front aeration tank 121 of the first aeration basin 12 by means of a backflow pipe 1342, to be used as a microorganism source for subsequent treatment. The water in the upper part of the settling basin 13 is discharged to a second filter 15 through a water discharging pipe 136 to be filtered secondly to reach the standard of fresh drinking.

In the embodiment, the structure of the second filter 15 is identical to the aforementioned first filter 11, and both are supplied with reverse cleaning water from the same reverse cleaning water container 16, for cleaning the filtering yarns.

Testing results of water quality taken in each treatment stage in the embodiment are shown in Table 1.

TABLE 1

| Testing Items | Unit | Tested Value | Standard Value | Testing Method |
|---|---|---|---|---|
| S01 seawater-not treated | | | | |
| coliform | CFU/100 ml | 0 | 6 | NIEA E203.50A |
| total colonies | CFU/L | 0 | 100 | NIEA E203.52B |
| turbidity | NTU | 7 | 4 | NIEA W219.59T |
| Sulfate | mg/L | 320 | 250 | NIEA W430.50A |
| nitrite nitrogen | mg/L | 0.5 | N.D | NIEA W418.50A |
| nitrate nitrogen | mg/L | 18 | 9.96 | NIEA W417.50A |
| total hardness | mg/L | 1000 | 500 | NIEA W208.50A |
| total suspended solids (SS) | PPM | 173~300 | 1~10 | NIEA E220.50C |
| Sodium | mg/L | 7340 | N.A | Refer to NIEA W306.50A |
| Salt | mg/L | 3.2 | N.A | Refer to NIEA W308.21B |
| Total dissolved solid | mg/L | 40000 | 800 | NIEA W210.50A |
| electric conductivity | Mhos/cm | 46800 | N.A | NIEA W203.50A |
| hydrogen ion concentration | PH | 12 ± 1 | 6.5~8.5 | NIEA W424.50A |
| oxygen dissolved amount | mg/L | 0.5 | N.D | NIEA W422.51C |

TABLE 1-continued

| Testing Items | Unit | Tested Value | Standard Value | Testing Method |
|---|---|---|---|---|
| S02 seawater-settled and filtered by the first filter 11 | | | | |
| Coliform | CFU/100 ml | 0 | 6 | NIEA E203.50A |
| total colonies | CFU/L | 0 | 100 | NIEA E203.52B |
| Turbidity | NTU | 3 | 4 | NIEA W219.59T |
| Sulfate | mg/L | 150 | 250 | NIEA W430.50A |
| nitrite nitrogen | mg/L | 0.22 | N.D | NIEA W418.50A |
| nitrate nitrogen | mg/L | 9 | 9.96 | NIEA W417.50A |
| total hardness | mg/L | 500 | 500 | NIEA W208.50A |
| total suspended solids (SS) | PPM | 70 | 1~10 | NIEA E220.50C |
| Sodium | mg/L | 400 | N.A | Refer to NIEA W306.50A |
| Salt | mg/L | 1.8 | N.A | Refer to NIEA W308.21B |
| Total dissolved solid | mg/L | 500 | 800 | NIEA W210.50A |
| electric conductivity | Mhos/cm | 3000 | N.A | NIEA W203.50A |
| hydrogen ion concentration | PH | 10 | 6.5~8.5 | NIEA W424.50A |
| oxygen dissolved amount | mg/L | 2 | N.D | NIEA W422.51C |
| S03 seawater-treated by the first bio-contact aeration basin 12 | | | | |
| Coliform | CFU/100 ml | 800 | 6 | NIEA E203.50A |
| total colonies | CFU/L | 3500 | 100 | NIEA E203.52B |
| Turbidity | NTU | 3 | 4 | NIEA W219.59T |
| Sulfate | mg/L | 140 | 250 | NIEA W430.50A |
| nitrite nitrogen | mg/L | 0.2 | N.D | NIEA W418.50A |
| nitrate nitrogen | mg/L | 9 | 9.96 | NIEA W417.50A |
| total hardness | mg/L | 500 | 500 | NIEA W208.50A |
| total suspended solids (SS) | PPM | 50 | 1~10 | NIEA E220.50C |
| Sodium | mg/L | 280 | N.A | Refer to NIEA W306.50A |
| Salt | mg/L | 1.2 | N.A | Refer to NIEA W308.21B |
| Total dissolved solid | mg/L | 350 | 800 | NIEA W210.50A |
| electric conductivity | Mhos/cm | 1700 | N.A | NIEA W203.50A |
| hydrogen ion concentration | PH | 8 | 6.5~8.5 | NIEA W424.50A |
| oxygen dissolved amount | mg/L | 4 | N.D | NIEA W422.51C |
| S04 seawater-treated by the second bio-contact aeration basin 12' | | | | |
| Coliform | CFU/100 ml | 1300 | 6 | NIEA E203.50A |
| total colonies | CFU/L | 5000 | 100 | NIEA E203.52B |
| Turbidity | NTU | 3 | 4 | NIEA W219.59T |
| Sulfate | mg/L | 1150 | 250 | NIEA W430.50A |
| nitrite nitrogen | mg/L | 0.18 | N.D | NIEA W418.50A |
| nitrate nitrogen | mg/L | 8 | 9.96 | NIEA W417.50A |
| total hardness | mg/L | 500 | 500 | NIEA W208.50A |
| total suspended solids (SS) | PPM | 50 | 1~10 | NIEA E220.50C |
| Sodium | mg/L | 150 | N.A | Refer to NIEA W306.50A |
| Salt | mg/L | 0.28 | N.A | Refer to NIEA W308.21B |
| Total dissolved solid | mg/L | 350 | 800 | NIEA W210.50A |
| electric conductivity | Mhos/cm | 1700 | N.A | NIEA W203.50A |
| hydrogen ion concentration | PH | 8 | 6.5~8.5 | NIEA W424.50A |
| oxygen dissolved amount | mg/L | 5 | N.D | NIEA W422.51C |
| S05 seawater-treated by the settling basin 13 | | | | |
| Coliform | CFU/100 ml | 200 | 6 | NIEA E203.50A |
| total colonies | CFU/L | 3200 | 100 | NIEA E203.52B |
| Turbidity | NTU | 1 | 4 | NIEA W219.59T |
| Sulfate | mg/L | 84 | 250 | NIEA W430.50A |
| nitrite nitrogen | mg/L | 0.1 | N.D | NIEA W418.50A |
| nitrate nitrogen | mg/L | 5 | 9.96 | NIEA W417.50A |
| total hardness | mg/L | 400 | 500 | NIEA W208.50A |
| total suspended solids (SS) | PPM | 10 | 1~10 | NIEA E220.50C |
| Sodium | mg/L | 90 | N.A | Refer to NIEA W306.50A |
| Salt | mg/L | 0.1 | N.A | Refer to NIEA W308.21B |

TABLE 1-continued

| Testing Items | Unit | Tested Value | Standard Value | Testing Method |
|---|---|---|---|---|
| Total dissolved solid | mg/L | 400 | 800 | NIEA W210.50A |
| electric conductivity | Mhos/cm | 1000 | N.A | NIEA W203.50A |
| hydrogen ion concentration | PH | 8 | 6.5~8.5 | NIEA W424.50A |
| oxygen dissolved amount | mg/L | 6 | N.D | NIEA W422.51C |
| S06 seawater-settled and filtered by the second filter 15 | | | | |
| Coliform | CFU/100 ml | 0 | 6 | NIEA E203.50A |
| total colonies | CFU/L | 40 | 100 | NIEA E203.52B |
| Turbidity | NTU | 0.05 | 4 | NIEA W219.59T |
| Sulfate | mg/L | 40 | 250 | NIEA W430.50A |
| nitrite nitrogen | mg/L | 0.01 | N.D | NIEA W418.50A |
| nitrate nitrogen | mg/L | 0.855 | 9.96 | NIEA W417.50A |
| total hardness | mg/L | 250 | 500 | NIEA W208.50A |
| total suspended solids (SS) | PPM | 0 | 1~10 | NIEA E220.50C |
| Sodium | mg/L | 30 | N.A | Refer to NIEA W306.50A |
| Salt | mg/L | 0 | N.A | Refer to NIEA W308.21B |
| Total dissolved solid | mg/L | 250 | 800 | NIEA W210.50A |
| electric conductivity | Mhos/cm | 200 | N.A | NIEA W203.50A |
| hydrogen ion concentration | PH | 7.5 | 6.5~8.5 | NIEA W424.50A |
| oxygen dissolved amount | mg/L | 7~8 | N.D | NIEA W422.51C |

According to the above tested results of water quality, after treated by the seawater desalinating apparatus of the embodiment, the final water quality has become to have the tested total colonies of 40 CFU/L from the original seawater free of microorganism colony, but this tested value is more less than the standard value of city water of 100 CFU/L. besides, the final water quality is better than the standard city water in terms of each tested item, and reaches the standard of drinking.

Second Embodiment

Sewage and Wastewater Purification Device

Figure 5:
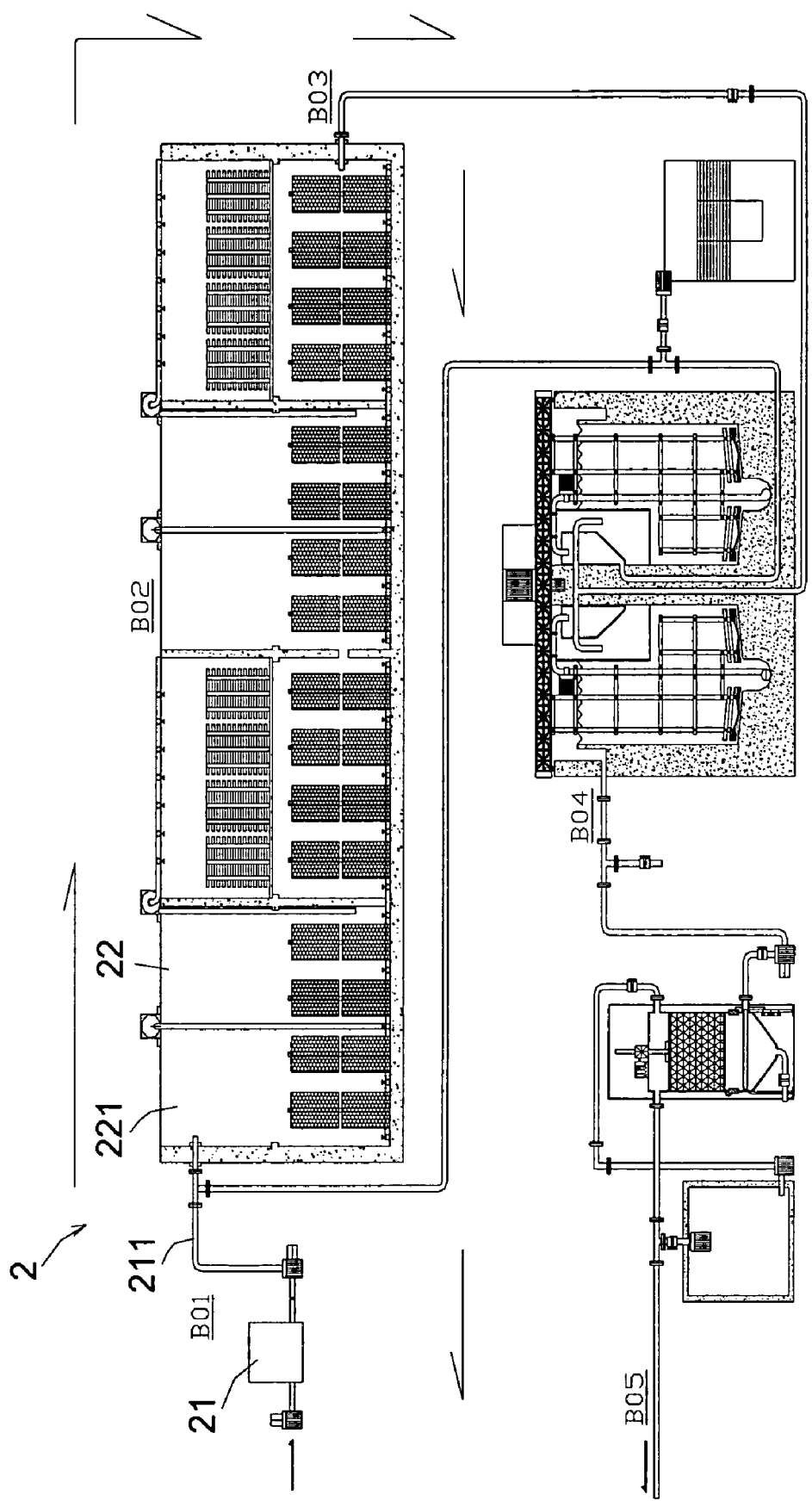
FIG. 5 is a view showing a system structure of a purification apparatus for sewage and wastewater in accordance with an embodiment of the present invention.

FIG. 5 is a schematic view showing a sewage and wastewater purification and treatment device in accordance with the present invention. As shown in FIG. 5, the sewage purification and treatment device 2 uses a barrier 21 in place of the first filter 11 in the seawater desalination device 1, and other components thereof are identical. The reference numerals of the assemblies of the settling basin in FIG. 5 are the same with those in FIG. 3.

In this embodiment, when the water source to be treated is domestic sewage, the sewage is fed to the front aeration tank 221 of the first contact aeration basin 22 through the water discharging pipe 211, after medium and big foreign materials and greases in the sewage are blocked by the barrier 21, and then the subsequent treatment processes are identical to those in the first embodiment.

Testing results of water quality taken in each treatment stage after treated by the present sewage and wastewater purification device are shown in Table 2.

TABLE 2

| Testing Items | Unit | Tested Value | Standard Value | Testing Method |
|---|---|---|---|---|
| B01 domestic sewage-treated by the barrier | | | | |
| coliform | CFU/100 ml | 1000 | 6 | NIEA E203.50A |
| total colonies | CFU/L | 30000 | 100 | NIEA E203.52B |
| turbidity | NTU | 8 | 4 | NIEA W219.59T |
| Chrome | platinum-cobalt scale | 3 | 15 | NIEA W201.50T |
| Odor | — | 10 | 3 | NIEA W206.50T |
| Arsenic | mg/L | 0.2 | 0.05 | NIEA W310.50A |
| Sulfate | mg/L | 400 | 250 | NIEA W430.50A |
| nitrite nitrogen | PPM | 0.5 | N.D | NIEA W418.50A |
| nitrate nitrogen | mg/L | 20 | 9.96 | NIEA W417.50A |
| total hardness | mg/L | 1000 | 500 | NIEA W208.50A |
| hydrogen ion concentration | PH | 10 | 6.5~8.5 | NIEA W424.50A |
| oxygen dissolved amount | mg/L | 0.5 | N.D | NIEA W422.51C |
| BOD | mg/L | 8 | N.D | NIEA W517.50B |
| SS | PPM | 2500 | 1~10 | NIEA E220.50C |

TABLE 2-continued

| Testing Items | Unit | Tested Value | Standard Value | Testing Method |
|---|---|---|---|---|
| B02 domestic sewage-treated by the first bio-contact aeration basin 22 | | | | |
| coliform | CFU/100 ml | 2000 | 6 | NIEA E203.50A |
| total colonies | CFU/L | 60000 | 100 | NIEA E203.52B |
| turbidity | NTU | 7 | 4 | NIEA W219.59T |
| chrome | platinum-cobalt scale | 4 | 15 | NIEA W201.50T |
| odor | — | 6 | 3 | NIEA W206.50T |
| arsenic | mg/L | 0.1 | 0.05 | NIEA W310.50A |
| sulfate | mg/L | 300 | 250 | NIEA W430.50A |
| nitrite nitrogen | PPM | 0.4 | N.D | NIEA W418.50A |
| nitrate nitrogen | mg/L | 18 | 9.96 | NIEA W417.50A |
| total hardness | mg/L | 1000 | 500 | NIEA W208.50A |
| hydrogen ion concentration | PH | 8 | 6.5~8.5 | NIEA W424.50A |
| oxygen dissolved amount | mg/L | 2 | N.D | NIEA W422.51C |
| BOD | mg/L | 7 | N.D | NIEA W517.50B |
| SS | PPM | 3000 | 1~10 | NIEA E220.50C |
| B03 domestic sewage-treated by the second bio-contact aeration basin 22' | | | | |
| coliform | CFU/100 ml | 2000 | 6 | NIEA E203.50A |
| total colonies | CFU/L | 60000 | 100 | NIEA E203.52B |
| turbidity | NTU | 4 | 4 | NIEA W219.59T |
| chrome | platinum-cobalt scale | 10 | 15 | NIEA W201.50T |
| odor | — | 4 | 3 | NIEA W206.50T |
| arsenic | mg/L | 0.05 | 0.05 | NIEA W310.50A |
| sulfate | mg/L | 200 | 250 | NIEA W430.50A |
| nitrite nitrogen | PPM | 0.3 | N.D | NIEA W418.50A |
| nitrate nitrogen | mg/L | 15 | 9.96 | NIEA W417.50A |
| total hardness | mg/L | 1000 | 500 | NIEA W208.50A |
| hydrogen ion concentration | PH | 8 | 6.5~8.5 | NIEA W424.50A |
| oxygen dissolved amount | mg/L | 5 | N.D | NIEA W422.51C |
| BOD | mg/L | 4 | N.D | NIEA W517.50B |
| SS | PPM | 3000 | 1~10 | NIEA E220.50C |
| B04 domestic sewage-treated by the settling basin 23 | | | | |
| coliform | CFU/100 ml | 10 | 6 | NIEA E203.50A |
| total colonies | CFU/L | 400 | 100 | NIEA E203.52B |
| turbidity | NTU | 0.5 | 4 | NIEA W219.59T |
| chrome | platinum-cobalt scale | 20 | 15 | NIEA W201.50T |
| odor | — | 3 | 3 | NIEA W206.50T |
| arsenic | mg/L | 0.01 | 0.05 | NIEA W310.50A |
| sulfate | mg/L | 100 | 250 | NIEA W430.50A |
| nitrite nitrogen | PPM | 0.1 | N.D | NIEA W418.50A |
| nitrate nitrogen | mg/L | 118 | 9.96 | NIEA W417.50A |
| total hardness | mg/L | 500 | 500 | NIEA W208.50A |
| hydrogen ion concentration | PH | 8 | 6.5~8.5 | NIEA W424.50A |
| oxygen dissolved amount | mg/L | 5 | N.D | NIEA W422.51C |
| BOD | mg/L | 10 | N.D | NIEA W517.50B |
| SS | PPM | 30 | 1~10 | NIEA E220.50C |
| B05 domestic sewage-settled and treated by the filter 25 | | | | |
| Coliform | CFU/100 ml | 0 | 6 | NIEA E203.50A |
| total colonies | CFU/L | 40 | 100 | NIEA E203.52B |
| Turbidity | NTU | 0.05 | 4 | NIEA W219.59T |
| Chrome | platinum-cobalt scale | 50 | 15 | NIEA W201.50T |
| Odor | — | 0 | 3 | NIEA W206.50T |
| Arsenic | mg/L | 0.005 | 0.05 | NIEA W310.50A |
| Sulfate | mg/L | 50 | 250 | NIEA W430.50A |
| nitrite nitrogen | PPM | 0.01 | N.D | NIEA W418.50A |
| nitrate nitrogen | mg/L | 0.85 | 9.96 | NIEA W417.50A |
| total hardness | mg/L | 250 | 500 | NIEA W208.50A |
| hydrogen ion concentration | PH | 7.2 | 6.5~8.5 | NIEA W424.50A |
| oxygen dissolved amount | mg/L | 8 | N.D | NIEA W422.51C |
| BOD | mg/L | 0 | N.D | NIEA W517.50B |
| SS | PPM | 0 | 1~10 | NIEA E220.50C |

As known from the results in Table 2, when the sewage is treated by the sewage and wastewater purification and treatment device in this embodiment, the water quality can reach the standard of discharging only after B04 stage, that is after treated through the barrier, the bio-contact aeration unit and the settling basin. After further settled and filtered by the filter of the present invention, the final water quality is better than the standard city water in terms of each tested item, and reaches the standard of drinking.

As shown from the tested results of water quality of S03, S04 in Table 1, and B02, B03 in Table 2, the bio-contact aeration unit of the present invention do can promote efficiently microorganism growth and the efficient of decomposing the foreign materials dissolved in water, through the over water bio-film contact part.

Furthermore, it is approved from the tested results of water quality of S05 in Table 1 and B04 in Table 2 in that the cylindrical main body of the settling basin of the present invention allows the sludge scrapper continually and circularly scrap sludge, thus improves the efficient of scrapping sludge as compared with a conventional settling basin in the form of a square. Especially, since the settled sludge is gathered in the sludge gathering tank on the basin top, and is prevent from distributing into the water again by the interference of the scrapper or inletting water stream, the efficient of sludge removing in the settling basin can be further increased.

Also, as shown from the tested results of water quality of S06 in Table 1, and B05 in Table 2, no matter how many microorganisms residue in the water after settled by the settling basin, they can be removed efficiently by the rapid water purification filter of the present invention.

Figure 6:
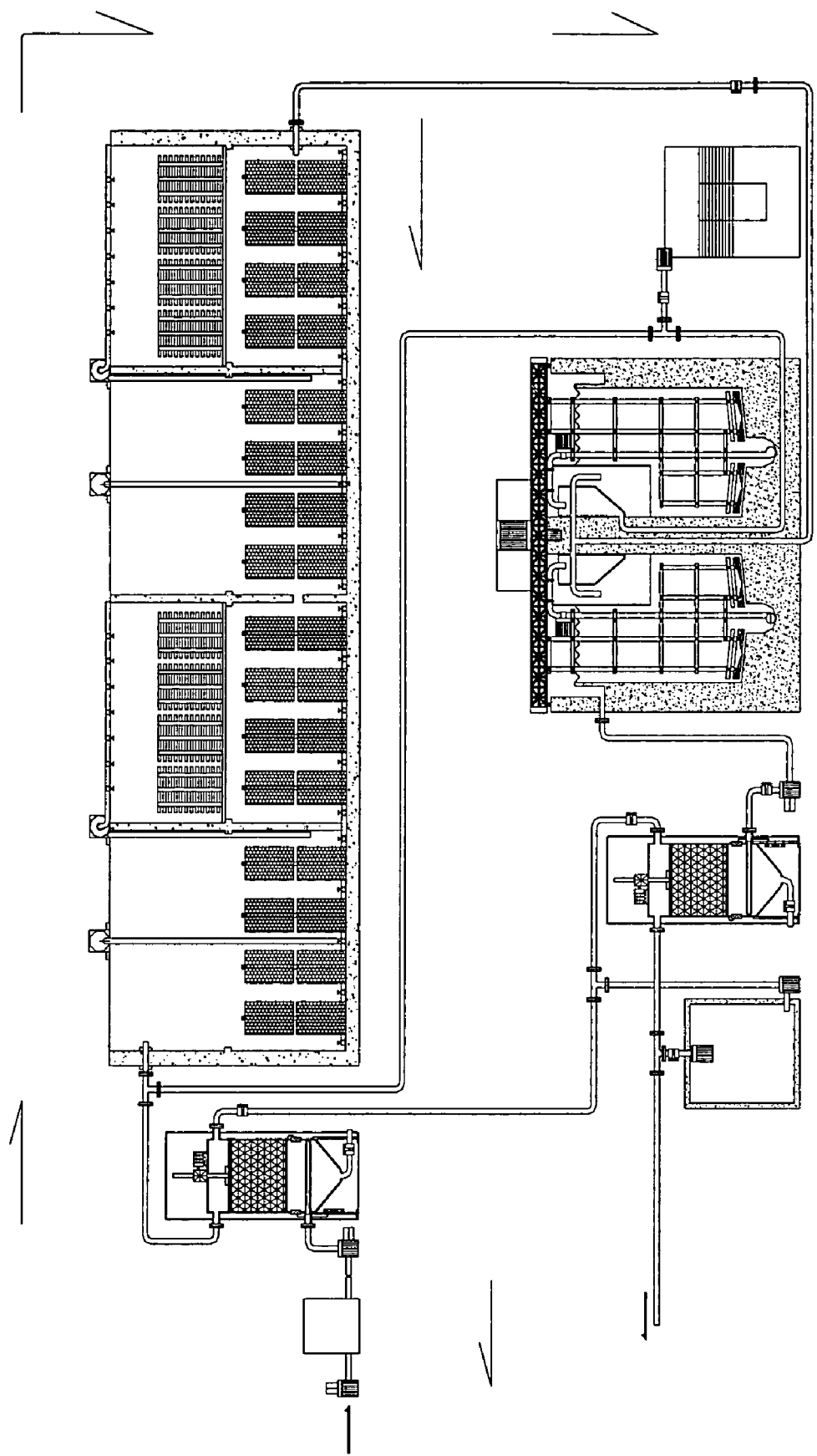
FIG. 6 is a view showing a system structure of a purification apparatus for sewage and wastewater in accordance with another embodiment of the present invention.

When industrial or stocking wastewater that is polluted seriously is purified by the water purification and treatment device of the present invention, it is also possible to use the barrier and the rapid water purification filter before and after the use of the bio-contact aeration unit, or use the barrier and the cylindrical settling basin in order, and then use the bio-contact aeration unit, one example of the devices and the processes is shown in FIG. 6.

As compared with a conventional drinking water treatment process, such as R.O. (reversed osmosis) and destination processes, using the water purification and treatment device and the water treatment process of the present invention will not generate secondary pollution, and the water production from the seawater can reach 70~85% of drinking water and 15~30% of sodium chloride, with less wasting, and the water quality after treated has only salts of 0~0.01%, and free of SS foreign materials, which is better than conventional processes nowadays.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A water purification and treatment apparatus, for use in seawater desalination and purification, comprising a filtering unit, a bio-contact aeration unit and a settling unit, wherein the filtering unit comprises at least one rapid water purification filter having a filtering tank, a hopper base disposed at a bottom of the filtering tank for sludge settlement and discharge, an ultrasonic oscillator disposed on the hopper base, a plurality of filtering yarns received in the filtering tank; wherein the filtering yarns are compacted by an oil hydraulic press to increase the filtering efficiency of foreign materials contained in the water; when the filtering unit is operated to perform a reverse cleaning process, the filtering yarns are sufficiently extended by the oil hydraulic press and efficiently and rapidly cleaned under the action of the ultrasonic oscillator, such that the foreign materials attached on the filtering yarns are shaken down to the hopper base for discharge;

the bio-contact aeration unit comprises at least one bio-contact aeration basin disposed one after another, the bio-contact aeration basin including a front aeration tank having an under water bio-film contact part, and a rear aeration tank having an under water bio-film contact part and an over water bio-film contact part, in which when the water to be treated and coming from the filter unit flows through the under water bio-film contact part of the front aeration tank, the water obtains a first dissolved oxygen from an aeration generator disposed at a bottom of the front aeration tank and the rear aeration tank; then, the water flows through a water sprayer disposed on a top of the rear aeration tank, contacts with air to obtain a second dissolved oxygen, and flows into the rear aeration tank; further, when the water flows through the over water bio-film contact part of the rear aeration tank, the water obtains a third dissolved oxygen from photosynthesis of algae growing thereon; finally, the water flows into the under water bio-film contact part of the rear aeration tank to continuously obtain a further dissolved oxygen from the aeration generator disposed at the bottom of the rear aeration tank; thereby the water obtains sufficient dissolved oxygen to provide a good growing environment for microorganisms; and the settling unit comprises at least one settling basin for subsequently treating the water coming from the bio-contact aeration unit, the settling basin having a cylindrical main body and a sludge scrapping device operated circularly; wherein a circular U-shaped sludge directing channel is defined on a bottom of the settling basin and between a center and a side wall of the settling basin for preventing from the sludge buoyancy when the water flows into the center of the settling basin; the sludge scrapping device comprises at least two scrappers disposed at both sides of the U-shaped sludge directing channel, respectively, for scrapping the sludge into the U-shaped sludge directing channel;

whereby the water to be treated flows in order though the filtering unit, the bio-contact aeration unit and the settling unit, and is purified and desalinated.

2. The water purification and treatment apparatus as claimed in claim 1, wherein a baffler is provided at a front of the filtering unit for removing larger foreign materials contained in the water.

3. The water purification and treatment apparatus as claimed in claim 1, wherein the under water bio-film contact part has a filtering material, which is one of PP, PB, and PVC, and is a cellular type bio-film.

4. The water purification and treatment apparatus as claimed in claim 1, wherein the over water bio-film contact part has a filtering material, which is one of wood, PP, PB, and PVC, and is a lathing type bio-film.

5. The water purification and treatment apparatus as claimed in claim 1, wherein the over water bio-film contact part is positioned at 50~100 cm above the water level.

6. The water purification and treatment apparatus as claimed in claim 1, wherein the settling basin further comprises a sludge gathering tank disposed at a top of the settling basin and a sludge suction device for suctioning the sludge from the U-shaped sludge directing channel to the sludge gathering tank.

7. The water purification and treatment apparatus as claimed in claim 1, wherein a ring-shaped guard board is further provided between the side wall of the cylindrical main body and the sludge gathering tank of the settling basin.

* * * * *